(12) United States Patent
Dobkin et al.

(10) Patent No.: US 9,348,347 B2
(45) Date of Patent: May 24, 2016

(54) VOLTAGE GENERATOR WITH CURRENT SOURCE COMPENSATED FOR AN ERROR CURRENT OPERABLE OVER A WIDE VOLTAGE RANGE

(71) Applicant: Linear Technology Corporation, Milpitas, CA (US)

(72) Inventors: Robert Dobkin, Monte Sereno, CA (US); Amitkumar Pravin Patel, Milpitas, CA (US)

(73) Assignee: Linear Technology Corporation, Milpitas, CA (US)

( * ) Notice: Subject to any disclaimer, the term of this patent is extended or adjusted under 35 U.S.C. 154(b) by 100 days.

(21) Appl. No.: 13/969,865

(22) Filed: Aug. 19, 2013

(65) Prior Publication Data

US 2014/0312865 A1 Oct. 23, 2014

Related U.S. Application Data

(60) Provisional application No. 61/813,485, filed on Apr. 18, 2013.

(51) Int. Cl.
| | |
|---|---|
| *H02M 3/156* | (2006.01) |
| *G05F 1/575* | (2006.01) |
| *G05F 1/565* | (2006.01) |
| *H02M 1/08* | (2006.01) |
| *G05F 1/56* | (2006.01) |
| *G05F 1/573* | (2006.01) |
| *H02M 3/158* | (2006.01) |

(52) U.S. Cl.
CPC ........... *G05F 1/56* (2013.01); *G05F 1/565* (2013.01); *G05F 1/573* (2013.01); *G05F 1/575* (2013.01); *H02M 1/08* (2013.01); *H02M 3/1588* (2013.01); *H02M 3/156* (2013.01)

(58) Field of Classification Search
USPC .................................................. 323/273–282
See application file for complete search history.

(56) References Cited

U.S. PATENT DOCUMENTS

| | | | | |
|---|---|---|---|---|
| 4,251,743 | A | * | 2/1981 | Hareyama .................... 327/538 |
| 2012/0126719 | A1 | * | 5/2012 | Van de Maele et al. ...... 315/307 |

* cited by examiner

*Primary Examiner* — Timothy J Dole
*Assistant Examiner* — Ishrat Jamali
(74) *Attorney, Agent, or Firm* — Patent Law Group LLP; Brian D. Ogonowsky (57) ABSTRACT

In one embodiment, a regulator circuit for generating a regulated output voltage Vout has an error amplifier using a pair of bipolar transistors at its front end. The error amplifier compares the regulated output voltage to a reference voltage Vref. A precision current source draws a first current through a user-selected set resistance to generate the desired Vref. The regulator circuit controls a power stage to cause Vout to be equal to Vref. The base current into one of the bipolar transistors normally distorts the current through the set resistance. A base current compensation circuit is coupled to the current source to adjust the first current by a value equal to the base current to offset the base current. Therefore, Vref is not affected by the base current. The error amplifier may be in a linear regulator or a switching regulator. The compensation circuit may be used in other applications.

25 Claims, 6 Drawing Sheets

VOLTAGE GENERATOR WITH CURRENT SOURCE COMPENSATED FOR AN ERROR CURRENT OPERABLE OVER A WIDE VOLTAGE RANGE

CROSS-REFERENCE TO RELATED APPLICATIONS

This application claims priority to U.S. Provisional Application Ser. No. 61/813,485, filed Apr. 18, 2013, by Robert Dobkin et al., assigned to the present assignee and incorporated herein by reference.

FIELD OF THE INVENTION

This invention relates to voltage regulator integrated circuits and, in particular, to a base current compensation circuit coupled to an error amplifier in such an IC.

BACKGROUND

The present invention applies to the error amplifier used in either a linear regulator or a switching regulator. The drawbacks of the prior art will be discussed with reference to a linear regulator.

Figure 1:
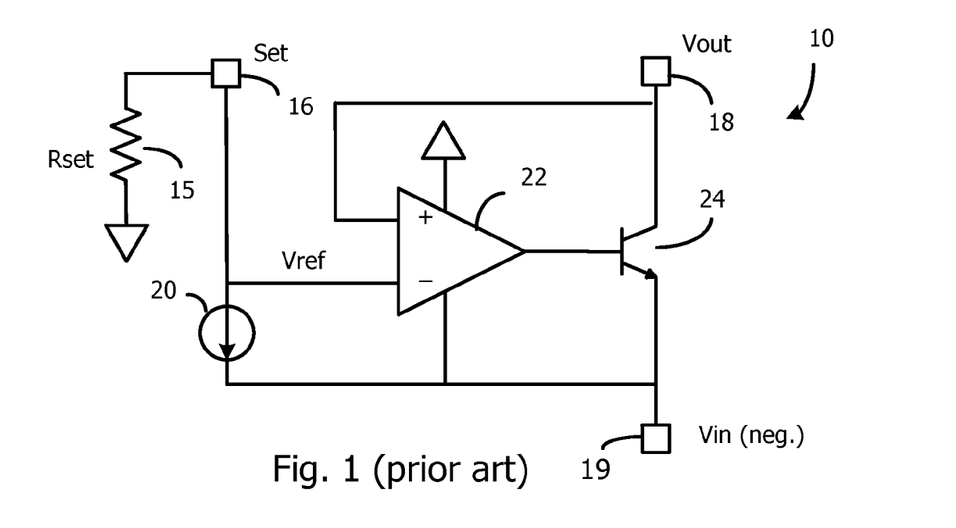
FIG. 1 illustrates a conventional negative voltage LDO regulator.

FIG. 1 illustrates one representative prior art linear regulator 10 integrated circuit, which is a negative voltage regulator, although the invention applies equally to positive voltage regulators. The term "linear regulator" is generally synonymous with a "low dropout (LDO) regulator." The term "low dropout" refers to the small minimum voltage differential that can occur between the input voltage terminal and the regulated output voltage terminal while still achieving regulation.

LDO regulators operate by varying the conductivity of a series transistor, connected between the input terminal and the output terminal, to achieve a predetermined output voltage. The output level of an operational amplifier (op amp), which is a type of differential amplifier, controls the conductivity of the series transistor. The op amp is sometimes referred to herein as an error amplifier. Typically, the regulator's output voltage is fed back into one input terminal of the op amp, and the conductivity of the series transistor is controlled to match the output voltage to a reference voltage applied to the other input of the op amp. The user selects the reference voltage. Alternatively, a divided output voltage is fed back and matched to a fixed reference voltage, where the user selects resistors for the divider to achieve the desired output voltage.

In FIG. 1, the user connects an Rset resistor 15 to a Set pin 16 of the IC to set the output voltage Vout provided at the Vout pin 18. A load is typically connected between the Vout pin 18 and ground. The input voltage (a negative voltage in this example, usually Vee) is applied to the Vin pin 19, so Vout will be somewhere between Vin (plus the dropout voltage) and ground. A fixed precision current source 20 supplies a fixed current through the Rset resistor 15 to generate a reference voltage Vref at the inverting input of the op amp 22, being used as an error amplifier. The output voltage Vout is applied to the non-inverting input of the op amp 22. The terms inverting and non-inverting simply refer to the two branches of the differential amplifier in the op amp 22, shown in FIG. 2.

Using an internal current source 20 and Rset resistor 15 to set the reference voltage is preferred to dividing the output voltage and matching the divided voltage (typically about 1.2 volts) to a fixed bandgap reference voltage source, since, by using the current source, the loop gain and bandwidth of the regulator are not affected by the output voltage, and Vout is allowed to go to a very low voltage.

The op amp 22 controls the conductivity of the pass transistor 24 so that Vout matches Vref.

Figure 2:
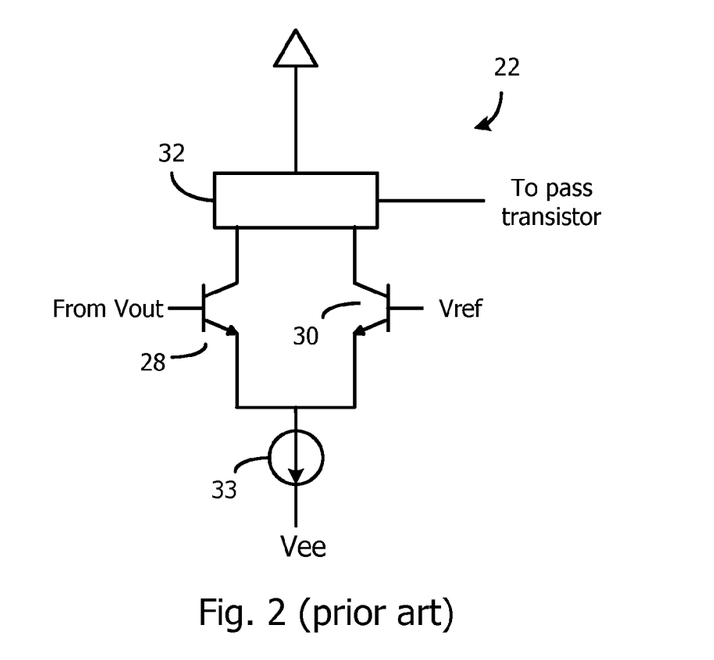
FIG. 2 illustrates a generic and conventional op amp that may be used in any linear regulator.

FIG. 2 is a basic example of one type of op amp 22, which represents a conventional op amp. The input signals Vout and Vref (from FIG. 1) are applied to NPN transistors 28 and 30. A current source 33 supplies a fixed current to the tied emitters of the transistors 28/30. Well known circuitry 32 provides a single ended output for driving the pass transistor 24 (FIG. 1). The circuitry 32 may include other differential amplifiers, current minors, current sources, and other well-known circuitry. The pertinent feature of the op amp 22 represented is the bipolar transistor input stage, drawing a base current Ib from the current source 20. The present invention applies to any type of op amp having a bipolar transistor input stage.

Figure 3:
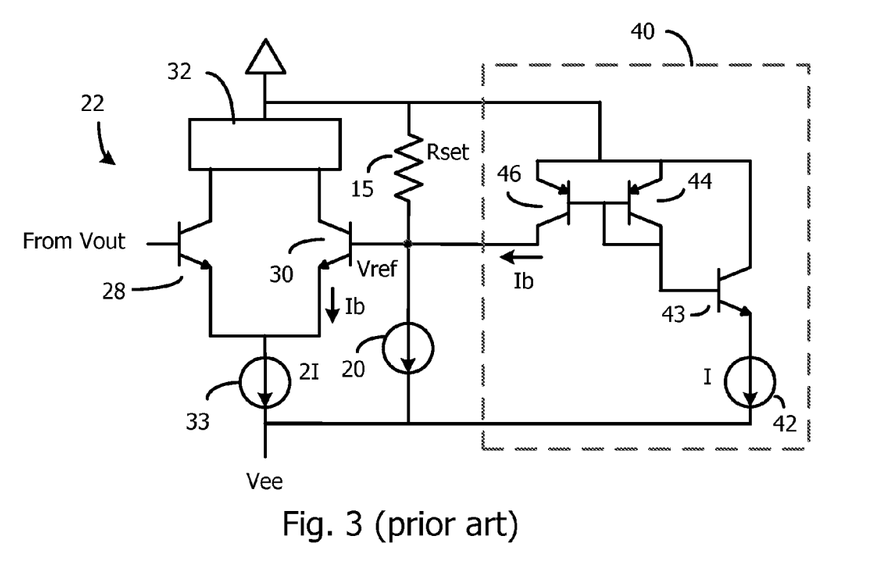
FIG. 3 illustrates a conventional base current compensation circuit for an op amp (error amplifier) in a linear or switching regulator.

FIG. 3 illustrates the op amp 22 along with a conventional base current compensation circuit 40 connected to the base of the transistor 30. No base current compensation is needed for the transistor 28. Since the current source 20 current (Isource) is a fixed known value and the user selects the precise Rset resistor value (R) to achieve a desired Vref equal to (Isource×R), any base current (Ib) into the transistor 30 will increase the voltage drop across the Rset resistor and distort the desired Vref value. Accordingly, it is known to provide the compensation circuit 40 to supply the same Ib current that is drawn by the transistor 30 to effectively cancel the effect of the base current drawn by the transistor 30. Many circuit configurations are possible, and FIG. 3 shows a representative example. FIG. 3 may also represent the op amp (error amplifier) in a switching regulator.

Assuming the current source 33 is designed to draw a current of 2I, the current source 42 in the compensation circuit 40 is designed to draw a current of I through the transistor 43 (since transistors 28 and 30 are assumed to be drawing equal currents I during regulation). Transistor 43 is matched to transistor 30. This will cause Ib to flow through the current minor of transistors 44 and 46. The mirrored current Ib is then added to the node coupling Vref to the base of the transistor 30 to cancel the Ib drawn by the transistor 30.

One problem with the conventional base current compensation circuit 40 of FIG. 3 is that it requires Vref to be at least about 0.3 volt below ground for proper operation. This limits the allowable Vout range. For some applications, a regulated output voltage between −0.3 volt and ground is needed. Similarly, in positive voltage regulators, the Vref cannot go within 0.3 volt of ground without adversely affecting the operation of the base current compensation circuit. Other types of base current compensation circuits require even more headroom to operate. Further, in a floating configuration (typically used for high voltages), where the ground pin is connected to Vout, the conventional base current compensation circuit does not have sufficient headroom to operate.

The problem occurs equally for error amplifiers in linear regulators and switching regulators.

What is needed is a base current compensation technique for a positive or negative regulator employing an error amplifier, where the compensation circuit does not limit the range of output voltage regulation due to the level of Vref.

SUMMARY

In one embodiment, an LDO regulator IC uses an on-chip current source which, along with a user-selected Rset resistor connected between a Set pin and system ground, sets the reference voltage Vref for the op amp (error amplifier). The op amp uses bipolar transistors in its input stage. The op amp drives a pass transistor connected between the input voltage (Vin) pin and the output voltage (Vout) pin.

In the case of a negative voltage regulator, the reference voltage Vref is tied to the inverting input of the op amp, and the non-inverting input of the op amp is tied to the Vout pin. The regulator controls the pass transistor to cause Vout to be substantially equal to the reference voltage.

A base current compensation circuit directly compensates the current source that sets Vref rather than supplies Ib directly to the Vref node (as done in the prior art). Since the compensation circuit may be coupled between the rails of the system or to another voltage source independent of Vref, and does not require any minimum or maximum level of Vref to operate, the operation of the compensation circuit is independent of the level of Vref and Vout.

In an example of compensating for an NPN transistor drawing base current from the current source in the Vref circuit, the current source is compensated to reduce the current drawn through the Rset resistor by Ib. If the op amp uses PNP transistors for its inputs, the target PNP transistor sources base current into the current source in the Vref circuit, and the current source is compensated to increase the current drawn through the Rset resistor by Ib.

The base current compensation technique applies equally to positive and negative voltage linear and switching regulators that set a Vref using a current source and an Rset resistor.

Various other embodiments are described.

BRIEF DESCRIPTION OF THE DRAWINGS

Elements that are the same or equivalent are labeled with the same numeral.

DETAILED DESCRIPTION

Figure 4:
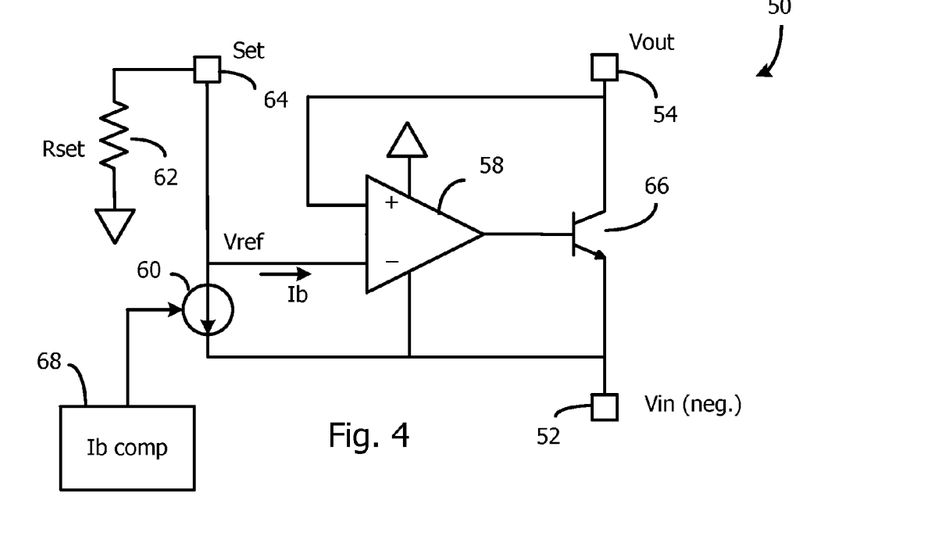
FIG. 4 illustrates a negative voltage LDO regulator IC in accordance with one embodiment of the present invention.

FIG. 4 illustrates the invention incorporated in a negative voltage LDO regulator 50, where the Vin pin 52 is connected to a negative power supply voltage Vin (also called Vee), and the Vout pin 54 is settable to provide virtually any voltage between ground and Vee minus the dropout voltage. A load would normally be connected between the Vout pin 54 and ground.

The power supply input terminals of the op amp 58 are connected between ground and the Vin pin 52. In other embodiments, the positive supply input terminal for the op amp 58 may be tied to a positive voltage or Vout. The negative voltage input terminal of the precision current source 60 is tied to the Vin pin 52. In one embodiment, the current source 60 generates 50 microamps. The non-inverting input of the op amp 58 is tied to the Vout pin 54. An Rset resistor 62 is connected by the user to the Set pin 64, which sets a Vref for comparison with Vout. The series transistor 66, connected between the Vin pin 52 and the Vout pin 54, is controlled to keep Vout substantially equal to Vref.

The op amp 58 may be any conventional op amp having a bipolar transistor front end, such as shown in FIG. 2 or other types.

Generating the reference voltage Vref using an on-chip current source 60 and an Rset resistor 62 is preferable over comparing a divided output voltage to a fixed bandgap reference, since operating characteristics of the feedback loop are not affected by the output voltage, and Vout is allowed to go to a very low voltage.

All components other than the Rset resistor 62 are on a single chip, which may be packaged in a 3 or 4-pin package.

Since it is assumed that the front end of the op amp 58 is that of FIG. 2, using NPN transistors, a base current is drawn by the NPN transistor 30 (FIG. 2) driven by Vref. Therefore, some of the current drawn through the Rset resistor 62 is due to the base current of the transistor 30, which would normally increase the desired Vref (in this case makes it more negative). A base current compensation circuit 68 is provided to cause the current source 60 to decrease its specified current by Ib, equal to the transistor's 30 base current, to offset the base current Ib drawn by the transistor 30. In other words, the current source 60 itself draws less current through the Rset resistor 62 to compensate for the transistor's base current. Therefore, the desired Vref is achieved.

Since the compensation circuit 68 can be powered by any voltage source and does not require any differential between Vref and another voltage to operate, the performance of the compensation circuit 68 is not affected by the level of Vref (which sets Vout). Therefore, Vout may be regulated to be close to or at ground, or close to Vin (depending on the type of regulator), while the compensation circuit 68 operates normally.

Figure 5:
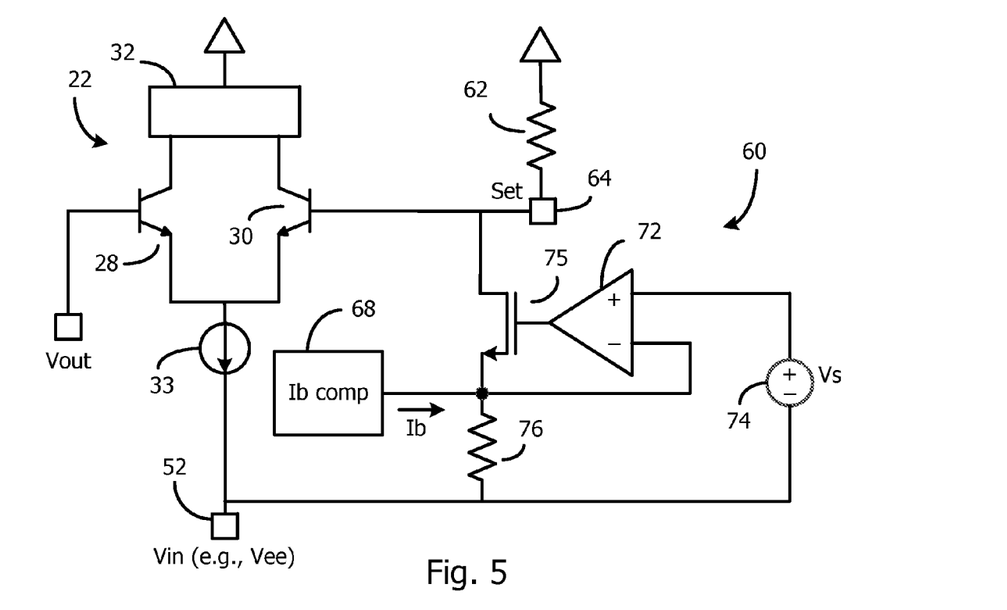
FIG. 5 illustrates additional detail of the current source and op amp of FIG. 4 in accordance with one embodiment of the present invention.

FIG. 5 illustrates one type of current source 60 that may be used in a regulator to set the Vref for the error amplifier. The op amp 22 (error amplifier) may be any type of op amp with an NPN bipolar transistor front end and may be the op amp 58 in FIG. 4, where the output of the circuit 32 drives the pass transistor 66 in FIG. 4.

A differential amplifier 72 has applied to its non-inverting terminal a voltage Vs from a voltage source 74 (referenced to the voltage on the Vin pin 52). An output of the amplifier 72 controls the conductivity of a MOSFET 75 connecting the Set pin 64 (and the Rset resistor 62) to a resistor 76 connected to the Vin pin 52. The top terminal of the resistor 76 is coupled to the inverting terminal of the amplifier 72 so that the MOSFET 75 is controlled to conduct a current to cause the voltage drop across the resistor 76 to equal Vs.

To compensate for the base current Ib into the transistor 30, the base current compensation circuit 68 generates a current equal to Ib and applies it to the node of the resistor 76. Therefore, the voltage drop across the resistor 76, having a value R, will be raised by Ib×R. This will effectively lower the current generated by the current source 60 by Ib to offset the transistor base current through the Rset resistor 62. Hence, Vref (and Vout) is not affected by the base current. This same technique can be applied to any type of current source to reduce or increase (depending on the type of op amp used) the current generated by the current source to compensate for the base current of the front end transistor.

Note that no base current compensation is needed for the Vout side of the op amp because Vout is regulated to equal Vref.

Figure 6:
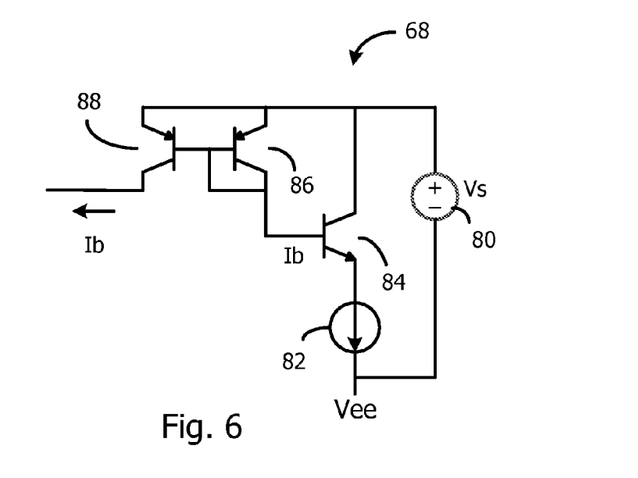
FIG. 6 illustrates detail of a base current compensation circuit that can be used in the circuit of FIG. 5, assuming NPN transistors are used in the op amp's front end, in accordance with one embodiment of the present invention.

FIG. 6 illustrates one example of the base current compensation circuit 68. The voltage source 80 supplies sufficient voltage for operation of the circuit. In the example of FIG. 6, the base current compensation circuit 68 is the same as the compensation circuit 40 in FIG. 3 except for its connection to the op amp and to a power source. Many other circuit configurations may be used for the compensation circuit 68.

Assuming the op amp current source 33 in FIG. 5 is designed to draw a current of 2I, the current source 82 in the compensation circuit 68 is designed to draw a current of I through the transistor 84 (since transistors 28 and 30 are assumed to be drawing equal currents I during regulation). Transistor 84 is matched to transistor 30. This will cause Ib to flow through the current minor of transistors 86 and 88. The mirrored current Ib is then added to the node coupling the resistor 76 in FIG. 5 to the MOSFET 75 to offset the Ib drawn by the transistor 30.

Figure 7:
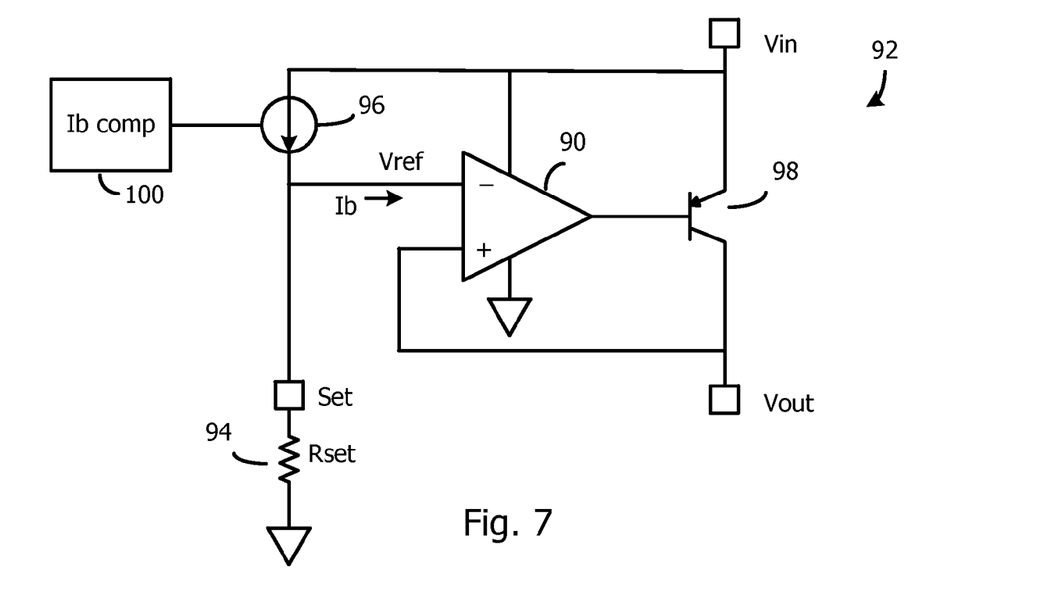
FIG. 7 illustrates a positive voltage LDO regulator employing the present invention.

FIG. 7 illustrates the invention being applied to the op amp 90 (error amplifier) of a positive voltage LDO regulator 92. In this example, Vref is a positive voltage set by the value of the Rset resistor 94 and the on-chip current source 96. The op amp 90 controls the PNP pass transistor 98 to cause Vout to be substantially equal to Vref.

It is assumed the front end of the op amp 90 includes NPN transistors sinking a base current Ib from the current source 96. This would normally lower the current through the Rset resistor 94 and lower Vref. However, the base current compensation circuit 100 operates to cause the current source 96 to increase its current by Ib to offset the base current so that the desired Vref is achieved. The current source 96 may be similar to that shown in FIG. 5, except the polarities would be reversed since Vin would be a positive supply voltage. Since the NPN transistor in the op amp 90 of FIG. 7 draws current away from the Rset resistor 94, the compensation circuit 100 needs to sink the current Ib away from the resistor 76 node (FIG. 5) to cause the MOSFET 75 to turn on more in order for the voltage drop across the resistor 76 to equal the voltage Vs. This increased current from the current source 96 in FIG. 7 thus compensates for the base current.

Figure 8:
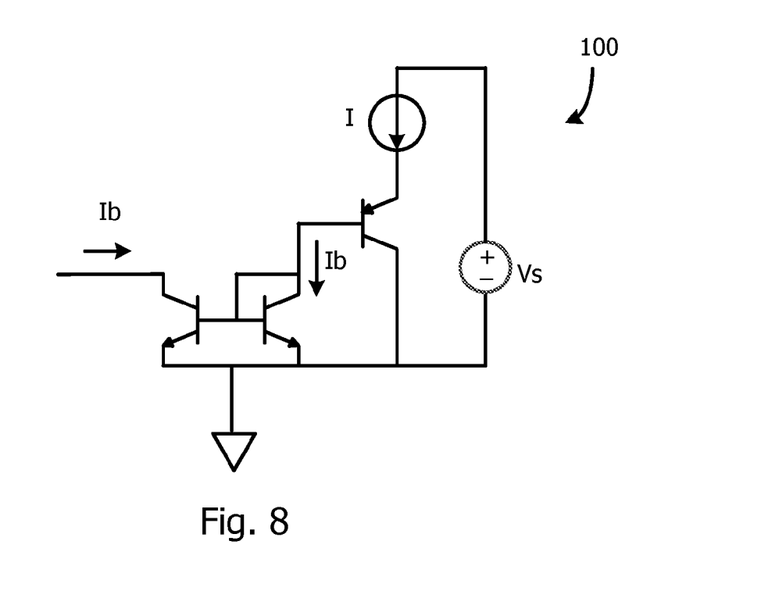
FIG. 8 illustrates detail of a base current compensation circuit that can be used in the regulator of FIG. 7 in accordance with one embodiment of the present invention FIGS. 9A and 9B together illustrate an error amplifier circuit for a negative voltage regulator similar to FIGS. 5 and 6 but adding another error amplifier circuit that takes over when Vee becomes within one diode drop of Vref (preventing the proper operation of the op amp 22 of FIG. 5).

FIG. 8 illustrates one embodiment of the compensation circuit 100 that sinks the current Ib from the resistor 76 (FIG. 5) node to cause the current source 96 (FIG. 7) to increase its specified current by Ib. Its operation is similar to that of FIG. 6 with the polarities of the transistors reversed.

The compensation circuit 100 may also be used with any type of op amp where the current from the Vref current source needs to be increase by Ib. Such may be the case with a negative voltage regulator using an op amp with PNP transistors in its front end.

Figure 9A:
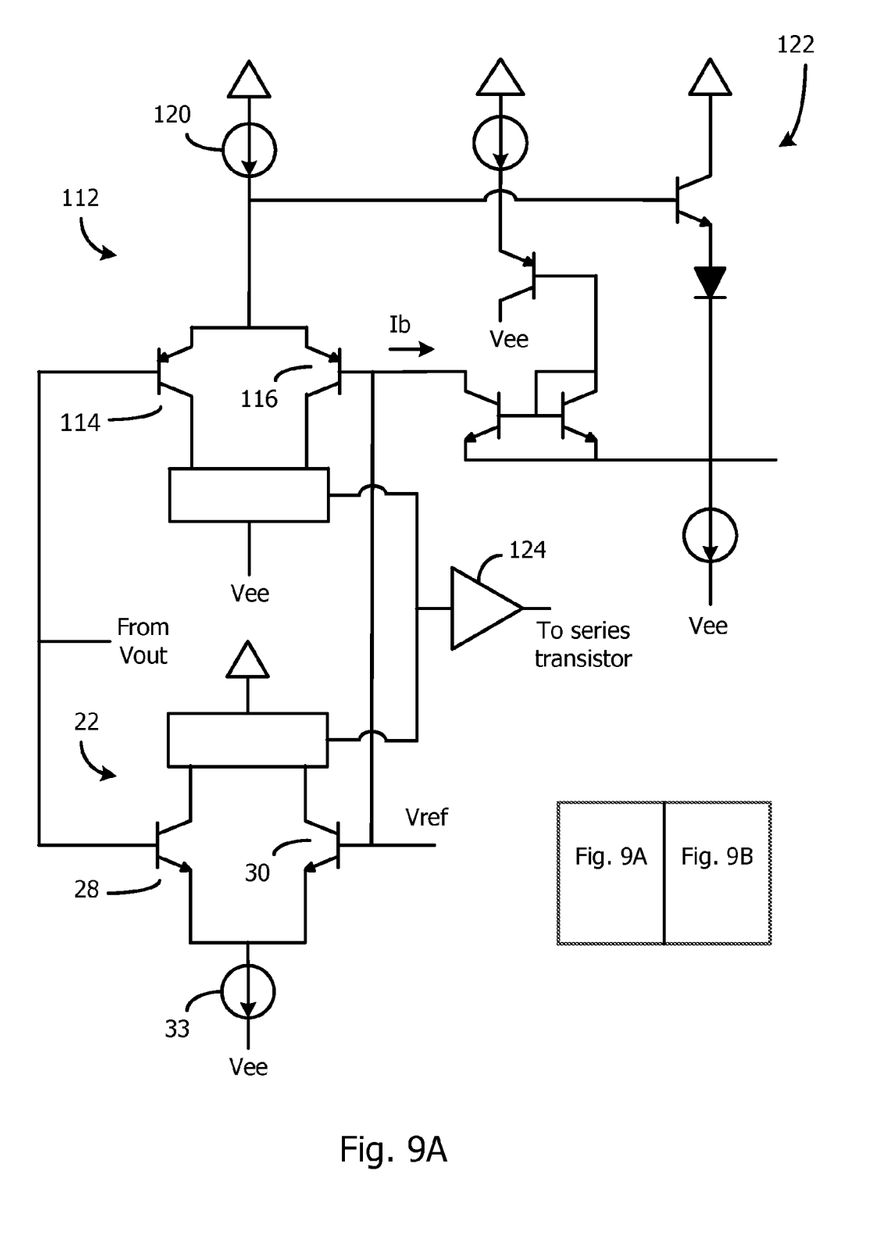
Figure 9B:
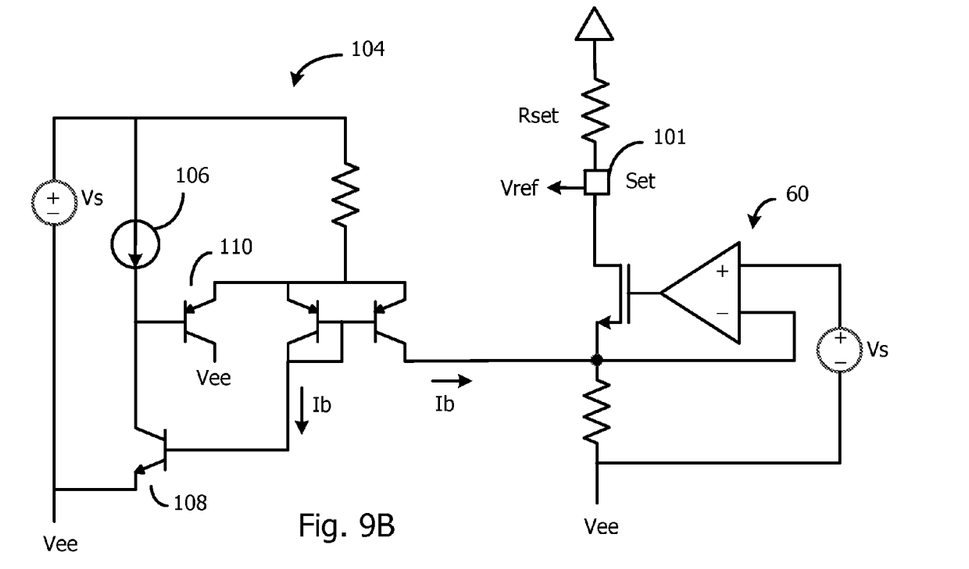

FIGS. 9A and 9B together illustrate the op amp portion of a negative voltage regulator that adapts to a wide range of negative input voltages Vee. The Set pin 101 of FIG. 9B, providing Vref, connects to the base of the transistor 30 at the bottom of FIG. 9A.

In FIG. 9B, the current source 60 is the same as that shown in FIG. 5. The base current compensation circuit 104 is similar to that shown in FIG. 6 but with the current source 106 connected to the collector of the transistor 108 rather than its emitter. The transistor 110 sets a biasing voltage for the transistor 108.

In the op amp 22 of FIG. 9A, if Vee becomes less than (Vref+Vbe), the current source 33 will not operate properly. Therefore, to increase the operating range of the regulator, another op amp 112 at the top of FIG. 9A takes over when Vee becomes less than (Vref+Vbe). The op amp 112 of FIG. 9A uses PNP transistors 114 and 116 in its differential amplifier, so the Vref only has to be more negative than ground for the current source 120 to operate. The base current compensation circuit 122 removes Ib from the node connecting Vref to the base of transistor 116 to compensate for the sourcing of Ib by the transistor 116.

The outputs of the op amps 22 and 112 may be applied to a buffer 124 that controls a pass transistor (connected between Vee and Vout) for regulating Vout.

The portion of the regulator at the top of FIG. 9A may be conventional since Vref will be close to Vee. The circuit portion at the bottom of FIG. 9A and in FIG. 9B is primarily useful for extending the range of Vout when Vout approaches ground, as described with respect to FIG. 4.

Those skilled in the art will understand the operation of the circuits of FIGS. 9A and 9B since the circuits are similar to those previously described.

Figure 10:
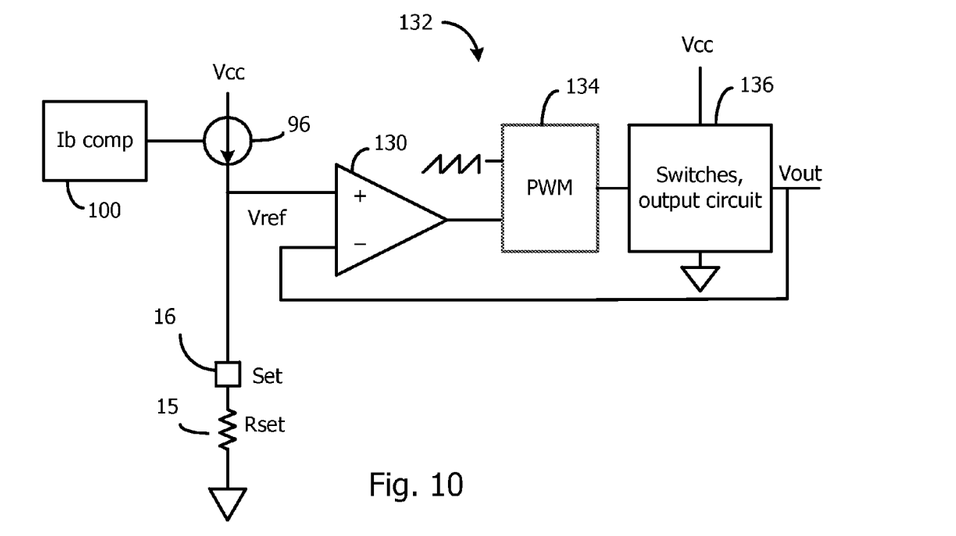
FIG. 10 illustrates the invention being incorporated in an error amplifier for a switching regulator.

FIG. 10 illustrates the base current compensation circuit 100 applied to the current source 96 for setting the Vref for an op amp 130 (an error amplifier) in a switching voltage regulator 132. A pulse width modulation circuit 134 compares the output of the op amp 130 with a sawtooth waveform and, when the signals cross, the PWM circuit 134 turns off the power switch in the circuit block 136. The power switch is turned on at the beginning of the next clock cycle. The power switch is typically a bipolar transistor or a MOSFET. The output voltage Vout is fed back into the op amp 130, and the duty cycle of the power switch is controlled to cause Vout to equal Vref. Switching power supplies are well known and further detail is not necessary.

Many other applications of the base current compensation scheme of the present invention are envisioned.

The compensation circuit is not limited for use in voltage regulators. For example, the compensation may be used in any circuit requiring a precision reference voltage despite any error currents added to or subtracted from the current source output current. In one embodiment, the compensation circuit may be used as a reference voltage generator in a temperature sensor.

The current source need not be connected to a resistance to generate a reference voltage and may be connected to another component. For example, the current source may be connected to a capacitor to generate a ramping signal for application to a comparator or other amplifier. The amplifier error current is then compensated by the present invention to improve the precision of the ramping voltage.

The error current need not be created by a bipolar transistor and may be from any circuit that adds to or subtracts a current from the current source.

In all cases, the operation of the inventive compensation circuit is not affected by the magnitude of the voltage generated at the output terminal of the current source. Accordingly, the voltage at the output terminal may extend to, for example, the low rail voltage, such as ground.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A circuit comprising:
    a first current source generating a first current and having an output terminal, a first voltage being generated at the output terminal;
    a set resistance coupled to the output terminal of the first current source, wherein a voltage drop across the set resistance generates a reference voltage for setting a target output level of a regulator;
    the output terminal also being connected to a control terminal of a transistor that introduces a first error current, wherein the first error current offsets the first voltage from a target first voltage; and
    a correction circuit connected to a second terminal of the first current source, the correction circuit generating a second current approximately equal to the first error current, which modifies the first current to compensate for the first error current so as to cause the first voltage to be approximately the target first voltage,
    wherein operation of the correction circuit is not dependent on a magnitude of the first voltage.

2. The circuit of claim 1 wherein the circuit is a voltage regulator circuit and wherein the first error current is an input current into an amplifier.

3. The circuit of claim 2 wherein the amplifier is an error amplifier receiving at a first input terminal a voltage corresponding to an output voltage of the regulator and receiving at a second input terminal a reference voltage, the reference voltage corresponding to the first voltage.

4. The circuit of claim 1 wherein the first error current is a base current into a bipolar transistor, and wherein the correction circuit comprises a base current compensation circuit generating the second current approximately equal to the base current of the bipolar transistor for adjusting the first current to compensate for the base current.

5. The circuit of claim 1 wherein the correction circuit is not connected to the output terminal of the first current source so as to be unaffected by the first voltage.

6. The circuit of claim 1 wherein the error current is a base current of a bipolar transistor, and the correction circuit is not connected to the base of the bipolar transistor so as to be unaffected by the first voltage.

7. The circuit of claim 1 wherein the circuit is a positive voltage regulator.

8. The circuit of claim 1 wherein the circuit is a negative voltage regulator.

9. The circuit of claim 1 wherein the circuit is a linear regulator.

10. The circuit of claim 1 wherein the circuit is an integrated circuit.

11. The circuit of claim 1 wherein the error current is an input current into an error amplifier in a voltage regulator, an output of the error amplifier being connected to control a pass transistor to generate a regulated voltage approximately equal to a voltage at the output terminal of the first current source.

12. The circuit of claim 1 wherein the first current source comprises a first transistor in a feedback loop, wherein a conduction of the first transistor controls a current through a resistor to generate a voltage at a first node to match a first reference voltage, and wherein the correction circuit provides the second current to the first node approximately equal to the first error current.

13. The circuit of claim 12 wherein the correction circuit sinks the second current from the first node approximately equal to the first error current.

14. The circuit of claim 12 wherein the correction circuit sources the second current to the first node approximately equal to the first error current.

15. The circuit of claim 1 wherein the first error current is a first base current for a first bipolar transistor, wherein the correction circuit comprises:
    a second current source providing a current through a second bipolar transistor to generate a second base current approximately equal to the first base current; and
    a current mirror connected to the second bipolar transistor to generate the second current coupled to the second terminal of the first current source.

16. A method performed by a circuit comprising:
    generating a first current by a first current source, the first current source having an output terminal, a first voltage being generated at the output terminal;
    providing a set resistance coupled to the output terminal of the first current source such that a voltage drop across the set resistance generates a reference voltage for setting a target output level of a regulator;
    introducing a first error current at the output terminal, the first error current being a control current for a transistor connected to the output terminal, the first error current offsetting the first voltage from a target first voltage; and
    generating a second current, by a correction circuit connected to a second terminal of the first current source, approximately equal to the first error current, which modifies the first current to compensate for the first error current so as to cause the first voltage to be approximately the target first voltage,
    wherein operation of the correction circuit is not dependent on a magnitude of the first voltage.

17. The method of claim 16 wherein the circuit is a voltage regulator circuit and wherein the first error current is an input current into an amplifier.

18. The method of claim 17 wherein the amplifier is an error amplifier receiving at a first input terminal a voltage corresponding to an output voltage of the regulator and receiving at a second input terminal a reference voltage, the reference voltage corresponding to the first voltage.

19. The method of claim 16 wherein the output terminal of the first current source is coupled to a resistance, and wherein a voltage drop across the resistance generates a reference voltage.

20. The method of claim 16 wherein the first error current is a base current into a bipolar transistor, and wherein the correction circuit comprises a base current compensation circuit generating the second current approximately equal to the base current of the bipolar transistor for adjusting the first current to compensate for the base current.

21. The method of claim 16 wherein the correction circuit is not connected to the output terminal of the first current source so as to be unaffected by the first voltage.

22. The method of claim 16 wherein the error current is a base current of a bipolar transistor, and the correction circuit is not connected to the base of the bipolar transistor so as to be unaffected by the first voltage.

23. The method of claim 16 wherein the error current is an input current into an error amplifier in a voltage regulator, the method further comprising controlling a pass transistor by an output of the error amplifier to generate a regulated voltage approximately equal to a voltage at the output terminal of the first current source.

24. The method of claim 16 wherein the first current source comprises a first transistor in a feedback loop, wherein a conduction of the first transistor controls a current through a resistor to generate a voltage at a first node to match a first reference voltage, and wherein the correction circuit provides the second current to the first node approximately equal to the first error current.

25. The method of claim 16 wherein the first error current is a first base current for a first bipolar transistor, wherein the correction circuit performs the method comprising:
   providing a current through a second bipolar transistor, using a second current source, to generate a second base current approximately equal to the first base current; and
   generating the second current using a current mirror coupled to the second bipolar transistor and coupled to the second terminal of the first current source.

* * * * *